Sept. 4, 1951    C. P. BEDFORD ET AL    2,566,871
DOOR HAVING CAST INNER PANEL AND RAIL TO WHICH
OUTER SHEET PANEL IS ATTACHED
Filed June 13, 1949    3 Sheets-Sheet 1

INVENTORS.
Clay P. Bedford,
Dean B. Hammond,
John L. Hallett.
BY
Harness, Dickey & Pierce
ATTORNEYS.

Sept. 4, 1951 C. P. BEDFORD ET AL 2,566,871
DOOR HAVING CAST INNER PANEL AND RAIL TO WHICH
OUTER SHEET PANEL IS ATTACHED
Filed June 13, 1949 3 Sheets-Sheet 2
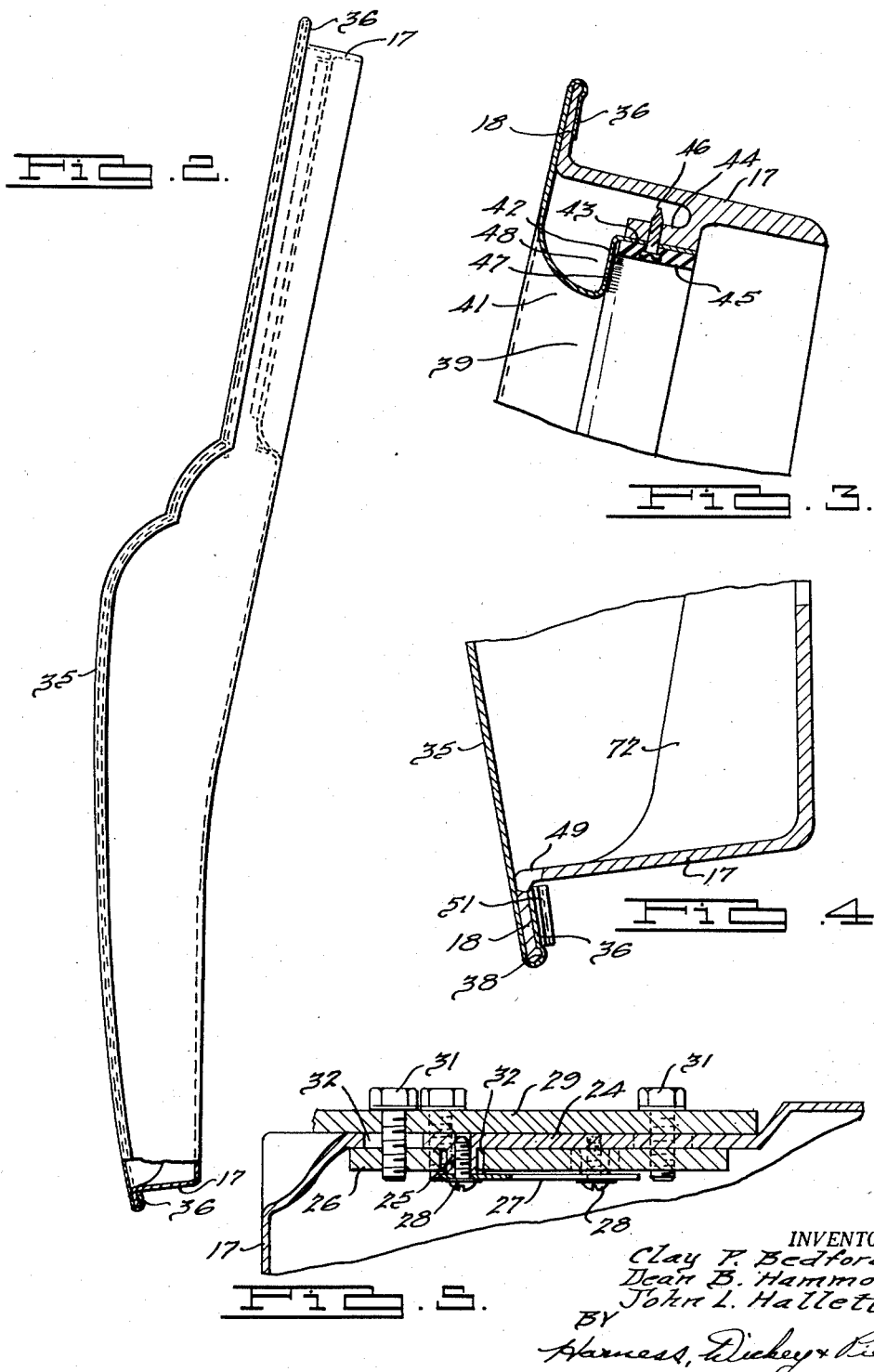
INVENTORS.
Clay P. Bedford,
Dean B. Hammond,
John L. Hallett.
BY
Harness, Dickey & Pierce
ATTORNEYS.

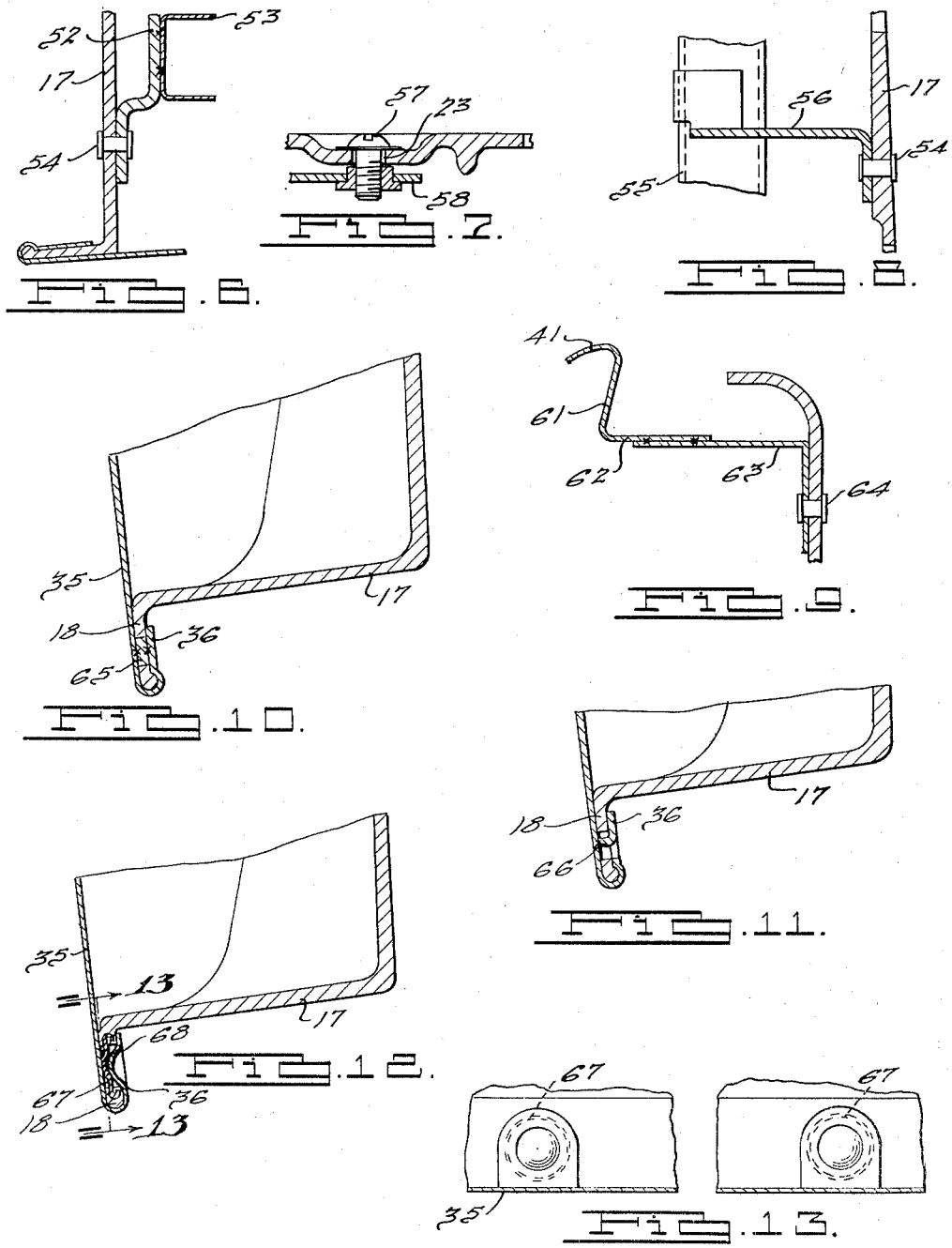

Patented Sept. 4, 1951

2,566,871

UNITED STATES PATENT OFFICE 2,566,871

DOOR HAVING CAST INNER PANEL AND RAIL TO WHICH OUTER SHEET PANEL IS ATTACHED

Clay P. Bedford, Ypsilanti, and Dean B. Hammond and John L. Hallett, Ann Arbor, Mich., assignors to Kaiser-Frazer Corporation, Willow Run, Mich., a corporation of Nevada Application June 13, 1949, Serial No. 98,802

12 Claims. (Cl. 296—44)

This invention relates to metal doors, and particularly to a door having a cast aluminum inner panel and side frame portions and a steel outer panel applied thereto.

In constructing metal doors such as those utilized for automotive vehicles and the like, it has usually been the practice to employ inner and outer stamped panels which were applied to a door rail. The inner panel and rail are usually made up from a plurality of stampings which are secured together by welding to provide reinforcement and the glass guide runs customarily provided for the window pane which closes an opening in the upper part of the door. The rail and inner panel support the hinges, the locks, the window regulator, the door dovetails and like hardware, and these are usually attached by bolts extending through punched openings in the inner panel and rail.

It was found by providing a unit casting for the inner panel and rail portions of the door that the assembled door weighed eight or nine pounds less than a comparable all-steel door. The number of panels and stampings necessary to construct the door were similarly reduced and the shape of the door was more accurately maintained by the use of the base casting. A substantial reduction in the number of machines required for building the door results from the use of the base aluminum stamping, such as those for forming, trimming and flanging the various metal stampings. The welding jigs utilized for securing the various panels together were likewise eliminated. The construction has the additional advantages of less reinforcement for the door rail, thereby decreasing the thickness of the rail and panel about the opening and permitting a larger opening to be utilized. The lighter door resulting from this construction reduces the hazards to the passengers and permits lighter hinges to be employed upon which the strain is substantially reduced. The cast door rail has a projecting flange at the outer edges about which the flange at the edge of the outer panel is reversely bent for securing the outer steel panel to the base casting. Provision is made for spot-welding the reversely bent flange to the body of the side panel whenever such additional support is deemed advisable.

Accordingly, the main objects of the invention are: to provide a base aluminum casting for a door which consists of an inner panel portion and a laterally flanged rail portion to which the steel outer panel may be applied; to form a door from a base casting comprising the inner panel and rail portions of the door to which a steel outer panel is secured by reversely bending the flange at the panel edges about a flange on the rail portion of the casting; to provide a base casting for a door having an inner panel portion and a rail portion on the outer edge of which a lateral flange extends with apertures provided in the inner panel portion and in the rail portions for receiving self-tapping screws which support the hardware for the doors; to cast an inner panel and rail portion for a door, with holes and apertures so located therein that the die for forming the casting may be separated to permit the casting to be removed, with the holes in position to receive self-tapping screws which secure the door hardware on the casting; and, in general, to provide a door made up of an outer steel panel and a casting embodying the door inner panel and rail portions which is simple in construction and economical of manufacture.

Other objects and features of novelty of the invention will be specifically pointed out or will become apparent when referring, for a better understanding of the invention, to the following description taken in conjunction with the accompanying drawings, wherein:

Fig. 2 is a side view of the door illustrated in Fig. 1, as viewed from the hinged edge thereof with a part broken away;

Fig. 3 is an enlarged sectional view of the door illustrated in Fig. 1, taken on the line 3—3 thereof;

Fig. 4 is an enlarged sectional view of the structure illustrated in Fig. 1, taken on the line 4—4 thereof;

Fig. 5 is an enlarged sectional view of the structure illustrated in Fig. 1, taken on the line 5—5 thereof;

Fig. 6 is an enlarged sectional view of the structure illustrated in Fig. 1, taken on the line 6—6 thereof;

Fig. 7 is an enlarged sectional view of the structure illustrated in Fig. 1, taken on the line 7—7 thereof;

Fig. 8 is an enlarged sectional view of the structure illustrated in Fig. 1, taken on the line 8—8 thereof;

Fig. 9 is an enlarged sectional view of the structure illustrated in Fig. 1, taken on the line 9—9 thereof;

Figs. 10, 11 and 12 are views of the structure illustrated in Fig. 4, showing a further form which the invention may assume, and Fig. 13 is a sectional view of the structure illustrated in Fig. 12, taken on the line 13—13 thereof.

Figure 1:
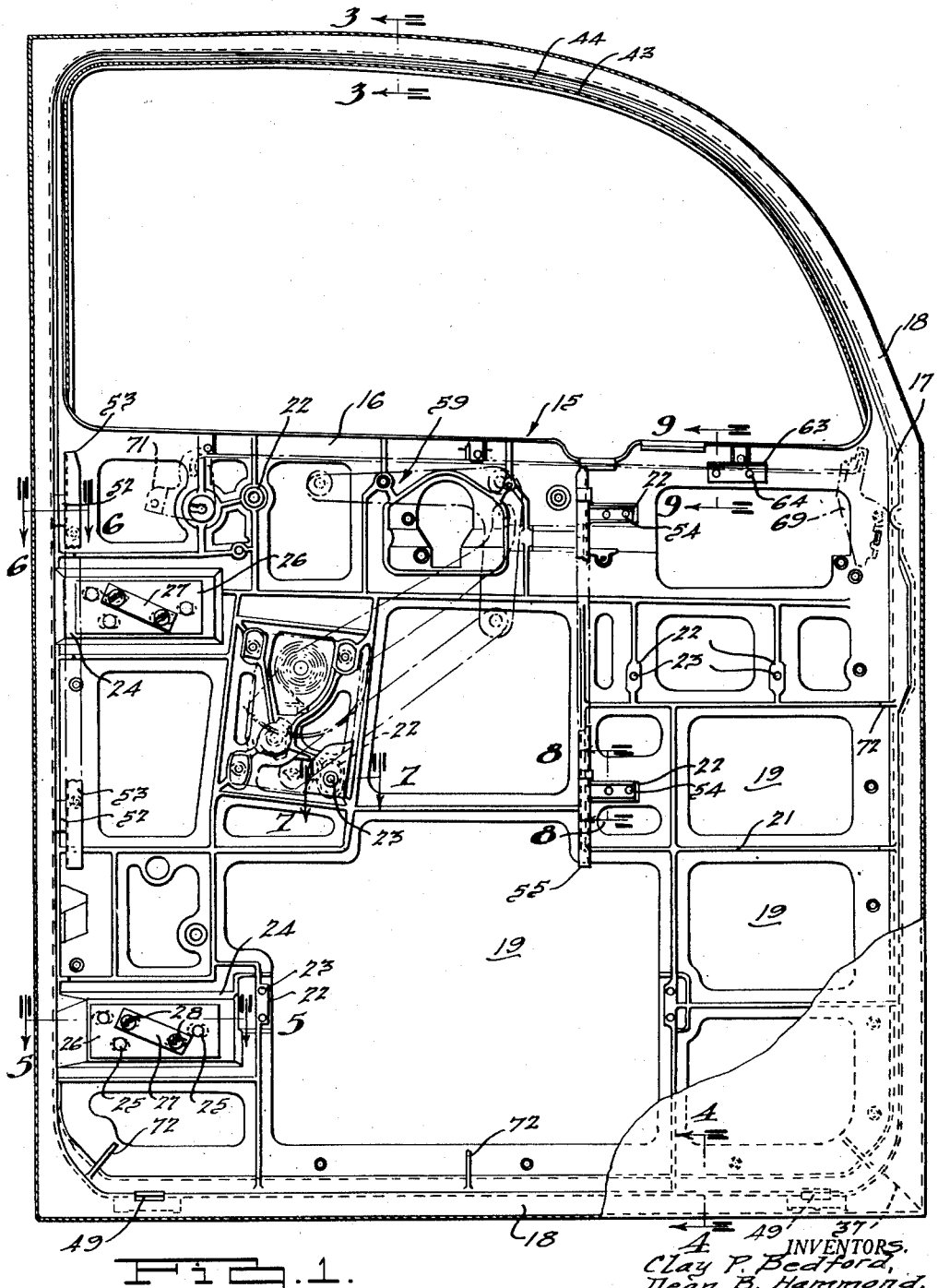
Figure 1 is an outer view of a door, with the steel outer panel broken therefrom, disclosing the inner panel and rail as a unit casting which embodies features of the present invention.

Referring to the figures, the door is illustrated as being constructed from a unit casting 15 which constitutes the rear panel 16, the side rail 17 and the lateral flanges 18 provided about the outer edge of the rail. A plurality of openings 19 are provided in the inner panel portion of the casting, the metal between the openings having ribs 21 for strengthening the panel portion while substantially reducing its weight. The inner panel portion is strengthened at various points, such as at 22, in which apertures 23 are cast for receiving self-tapping screws which secure the hardware thereon.

Reinforced offset areas 24 are provided for the hinges, having projecting bosses 25 on which the hinge supporting plates 26 are retained for adjustment by a plate 27 secured to the apertured ends of the bosses by self-tapping screws 28. A hinge leaf 29 is secured to the plate 26 by a plurality of screws 31 which pass through slots 32 in the hinge area 24 of the casting so that the hinge leaf 29 and the plate 26, which also contains slots 32 through which the bosses 25 extend, may be adjusted toward or from the rail portion 17 of the door before the screws 31 are tightened to secure the door in adjusted position on the hinge leaf 29.

The outer steel panel 33 is secured to the rail flanges 18 by having the edge flanges 36 reversely bent thereover. The edge flanges 36 have a V cut out of the corners so that the edges thereof substantially mate, as at 37, when the flanges 36 are reversely bent around the rail flanges 18. It will be noted in Figs. 3 and 4 that the flanges 18 have a ridge 38 along the inner edges about which the flanges 36 are rolled or otherwise formed to provide a bead on the flange conforming to the shape of the ridge which locks the outer panel to the casting and securely retains the front panel 35 on the base casting.

The front panel is provided with a window opening 39 having an arcuate reveal portion 41 thereabout, the inner edge of which is flanged inwardly at 42 and laterally at 43 to be secured to a ledge 44 provided on the inner surface of the rail 17 at the window opening of the casting. A base glass run strip 45 is secured to the flange 43, while a side glass run strip 47 is secured adjacent thereto to the flange 42. It is to be understood that screws, clips, adhesive material or the like may be employed for securing the strips 45 and 47 to the flanges 42 and 43, respectively. The sealing strips from the base and the one side of the glass guide run for the window (not illustrated), the other side of the channel being secured to an adjacent flange on the garnishing molding which is applied to the inner portion of the casting about the window opening in the conventional manner.

In Fig. 4 a drain opening 49 is illustrated through the rail 17 at the junction of the flange 18 therewith. A channel element 51 is secured adjacent to the opening, being welded to the flange 36 to complete the drain opening which would otherwise be covered by the door sealing strip which is applied to the flange 36 and the adjacent portion of the rail 17. Below the window opening, brackets 52, which are welded to the glass guide channel 53, are secured to the flange 17 of the base casting by rivets 54. Similarly, the glass guide channel 55, spaced therefrom, is supported on brackets 56 which are secured by rivets 54 to the inner panel portion of the base casting, spaced from the rail to permit the employment of a ventilating wing in the window opening.

Fig. 7 shows one of a plurality of apertures 23 provided in the inner panel portion of the base casting through which screws 57 extend for securing a plate 58 thereon which supports the window regulator 59 by which the window (not illustrated) is raised and lowered in the glass guide channels 53 and 55. The reveal portion 41 of the outer panel 35 along the lower edge of the window opening is flanged downwardly at 61. An inwardly directed tab 62 extending therefrom has a bracket 63 welded thereto, and secured to the inner panel portion of the casting by suitable means, herein illustrated as by rivets 64. This interconnection of the outer panel to the inner panel portion occurs between the glass guide channel 55 and the adjacent rail portion 17 of the casting. It is in this area that the ventilating wing is pivoted.

In Fig. 10, in addition to securing the flange 36 of the outer panel 35 to the flange 18 of the base stamping, the flange 36 is illustrated as being secured to the outer panel by welding. This is made possible by providing apertures in the flange 18 at the time of casting and thereafter placing steel plugs 65 therein so that the flange 36 may be welded therethrough to the outer panel. These apertures are distributed along the length of the flange 18 at points where it is found that such welding is desired.

Instead of employing the plugs 65 in the apertures in the flanges 18, the flanges 36 may have tongues 66 struck therefrom which engage the inner surface of the outer panel 35 through the apertures and welded together.

In Figs. 12 and 13, metal inserts 67 are illustrated in the flanges 18 at spaced points therealong. The inserts are shown as flanged buttons about the edge of which the metal of the casting becomes anchored for securing the buttons to the flanges. Embossed portions 68 on the flanges 36 of the outer panel engage the buttons and are welded thereto and to the outer panel 35. It is to be understood that the inserts 67 may be elongated so that several welds may be made between the outer panel and the flanges 36 through the elongated insert.

The locking mechanism 69 is bolted to the rail and to the inner panel portion of the casting in the usual manner, which is also true of the door releasing mechanism 71. The rail 17 of the base casting is reinforced with relation to the inner panel portion thereof by a plurality of ribs 72 extending between the junction thereof. It was found that a die for constructing the base panel of the door hereinabove described could be operated approximately fifty times an hour so that fifty base castings could be obtained in each hour of operation of the die. A tough ductile aluminum alloy is utilized as the casting metal so as to withstand the shock and permit a limited amount of weaving which occurs to vehicle bodies.

What is claimed is:

1. A door having a cast inner panel with a door rail disposed thereabout and about a window opening thereabove, a flat ledge extending inwardly from the inner face of the rail about the window opening forming the base of a glass channel, an outer panel secured to said rail having a window opening, the panel portion extending inwardly at the window opening being flanged outwardly to be disposed substantially parallel to the plane of the panel and inwardly providing a web normal thereto, and means for securing said web on said ledge.

2. A door having a cast inner panel with a door rail disposed thereabout and about a window opening thereabove, a flat ledge extending inwardly from the inner face of the rail about the window opening forming the base of a glass channel, an outer panel secured to said rail having a window opening, the panel portion extending inwardly at the window opening being flanged outwardly to be disposed substantially parallel to the plane of the panel and inwardly providing a web normal thereto, means for securing said web on said ledge, and a flat sealing strip secured to said web.

3. A door having a cast inner panel with a door rail disposed thereabout and about a window opening thereabove, a flat ledge extending inwardly from the inner face of the rail about the window opening forming the base of a glass channel, an outer panel secured to said rail having a window opening, the panel portion extending inwardly at the window opening being flanged outwardly to be disposed substantially parallel to the plane of the panel and inwardly providing a web normal thereto, means for securing said web on said ledge, a sealing strip secured to said web, and a strip having projecting fibers secured to said outwardly flanged portion of the outer panel about the top and sides of the window opening.

4. A door having a cast inner panel and a rail disposed thereabout and about a window opening thereabove, reinforced areas on said inner panel portion of the casting at the hinge supporting portion thereof, bosses extending from said reinforced areas, a hinge securing plate for each area having slots through which the bosses extend, and a plate secured across said bosses for retaining said hinge plate adjustable thereon, said reinforced areas having slots through which bolts extend when securing a hinge leaf to said plate so that the plate may be shifted relative to the bosses and reinforced areas for location relative to the door.

5. A door having a cast inner panel portion and a rail portion disposed thereabout, the outer edge of said rail portion having a lateral flange extending outwardly thereof, said rail portion being extended above the panel portion to form a window opening, a sheet metal outer panel having a window opening and having edge flanges which are reversely bent over the rail flanges for securing said outer panel thereon, and weldable elements extending through the walls of the outwardly extending rail flange by which the reversely bent flange of the outer panel is welded to the body of the outer panel.

6. A door having a cast inner panel portion and a rail portion disposed thereabout, the outer edge of said rail portion having a lateral flange extending outwardly thereof, said rail portion being extended above the panel portion to form a window opening, a sheet metal outer panel having a window opening and having edge flanges which are reversely bent over the rail flanges for securing said outer panel thereon, said outwardly extending rail flange having apertures, and plugs of weldable material inserted in said apertures to permit the welding of the reversely bent flange of the main panel to the body portion thereof.

7. A door having a cast inner panel portion and a rail portion disposed thereabout, the outer edge of said rail portion having a lateral flange extending outwardly thereof, said rail portion being extended above the panel portion to form a window opening, a sheet metal outer panel having a window opening and having edge flanges which are reversely bent over the rail flanges for securing said outer panel thereon, and metal inserts cast into the outwardly extending rail flange at spaced points in position to be engaged by the outer panel and the reversely bent flanges thereof.

8. A casting for a metal door having an inner panel portion, a rail portion thereabout and about a window opening thereabove, and an outwardly projecting flange extending from said rail portion at the edge thereof spaced from said panel portion, said panel portion having areas bounded by reinforced ribs to increase the strength of the panel portion, said reinforced areas having apertures provided therein during the casting operation for reducing the weight of the panel portion, the juncture of the rail with the rail flange at the bottom of the casting having a drain aperture provided therein during the casting operation.

9. A casting for a metal door having an inner panel portion, a rail portion thereabout and about a window opening thereabove, an outwardly projecting flange extending from said rail portion at the edge thereof spaced from said panel portion, said panel portion having areas bounded by reinforced ribs to increase the strength of the panel portion, and a flat ledge projecting inwardly from the inner face of the rail at the sides and top of the window opening to form a base support for a glass guide run.

10. A casting for a metal door having an inner panel portion, a rail portion thereabout and about a window opening thereabove, an outwardly projecting flange extending from said rail portion at the edge thereof spaced from said panel portion, said panel portion having cutaway areas bounded by reinforced ribs to reduce the weight and increase the strength of the panel portion, reinforced hinge supporting areas, a pair of bosses extending from said areas, a hinge supporting plate having slots through which the bosses extend, and a plate secured to the ends of the bosses for adjustably securing the plate thereon.

11. A casting for a metal door having an inner panel portion, a rail portion thereabout and about a window opening thereabove, an outwardly projecting flange extending from said rail portion at the edge thereof spaced from said panel portion, said panel portion having areas bounded by reinforced ribs to increase the strength of the panel portion, said reinforced areas having apertures provided therein during the casting operation for reducing the weight of the panel portion, and drain holes provided in the junction of the flange and rail, said holes in the reinforced areas and said drain holes being so disposed as to permit the casting to be disassembled from the die elements after the casting operation.

12. A casting for a metal door having an inner panel portion, a rail portion thereabout and about a window opening thereabove, an outwardly projecting flange extending from said rail portion at the edge thereof spaced from said panel portion, said panel portion having areas bounded by reinforced ribs to increase the strength of the panel portion, said reinforced areas having apertures provided therein during the casting operation for reducing the weight of the panel portion, drain holes provided in the junction of the flange and rail, said holes in the reinforced areas and said drain holes being so disposed as to permit the casting to be disassembled from the die elements after the casting operation, and hardware applied to said inner panel and rail portions of the casting by self-tapping screws which form a thread on the wall of said apertures.

CLAY P. BEDFORD.
DEAN B. HAMMOND.
JOHN L. HALLETT.

REFERENCES CITED

The following references are of record in the file of this patent:

UNITED STATES PATENTS

| Number | Name | Date |
|---|---|---|
| 1,663,520 | Ledwinka | Mar. 20, 1928 |
| 1,701,574 | Ledwinka | Feb. 12, 1929 |

FOREIGN PATENTS

| Number | Country | Date |
|---|---|---|
| 304,130 | Great Britain | Dec. 5, 1929 |
| 498,700 | Great Britain | Jan. 12, 1939 |

OTHER REFERENCES

"Autobody" (periodical), January 1928 issue, pages 26–28. Article entitled "Janoir Body with Aluminum-Alloy Frame."